(12) United States Patent
McCann (10) Patent No.: US 7,121,634 B2
(45) Date of Patent: Oct. 17, 2006

(54) PNEUMATICALLY ACTUATED PARKING BRAKE

(75) Inventor: Denis John McCann, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/864,785

(22) Filed: Jun. 9, 2004

(65) Prior Publication Data

US 2005/0275282 A1 Dec. 15, 2005

(51) Int. Cl.
*B60R 25/08* (2006.01)

(52) U.S. Cl. .......................... 303/89; 303/123; 303/127

(58) Field of Classification Search ............. 303/89 O, 303/123 X, 127 X, 7, 9, 9.61; 188/265
See application file for complete search history.

(56) References Cited

U.S. PATENT DOCUMENTS

| | | | | |
|---|---|---|---|---|
| 3,586,392 A | * | 6/1971 | Ballard et al. ................. | 303/89 |
| 4,015,455 A | * | 4/1977 | Leverton ........................ | 70/19 |
| 4,746,171 A | * | 5/1988 | Engle ........................... | 303/13 |
| 6,305,511 B1 | * | 10/2001 | McCann et al. ............. | 188/265 |
| 6,367,888 B1 | * | 4/2002 | Kee et al. ...................... | 303/89 |
| 6,382,741 B1 | * | 5/2002 | McCann et al. ............. | 303/191 |
| 6,505,714 B1 | * | 1/2003 | Ward .......................... | 188/72.1 |

FOREIGN PATENT DOCUMENTS

EP 1 064 182 B1 10/2002

\* cited by examiner

*Primary Examiner*—James McClellan
*Assistant Examiner*—Mariano Sy
(74) *Attorney, Agent, or Firm*—Carlson, Gaskey & Olds (57) ABSTRACT

A parking brake system uses a pneumatically controlled brake actuator to provide both service and parking brake functions. The parking brake system for a vehicle includes a hand control that is manually movable between a plurality of operational positions. A valve is responsive to movement of the hand control and controls air flow from a parking brake air supply to the pneumatically controlled brake actuator. The valve includes a gate that defines the plurality of operational positions, which include a park position, a release position, and an off position. When the hand control is moved out of the off position and into the park position, the pneumatically controlled brake actuator remains pressurized and a latching mechanism is activated to mechanically lock the vehicle brake. When the hand control is moved to the release position, the vehicle brakes are re-applied to unload the latching mechanism. The parking brake system can be used on vehicles equipped with an electronic braking system, or can be used on vehicles that do not have an electronic braking system.

20 Claims, 4 Drawing Sheets

PNEUMATICALLY ACTUATED PARKING BRAKE

BACKGROUND OF THE INVENTION

The subject invention relates to a parking brake system for a vehicle including a pneumatically controlled brake actuator that mechanically locks a service brake in a parked condition. The parking brake system can be used in a vehicle having an electronic braking system or can be used in a vehicle that does not have an electronic braking system.

Traditionally, heavy commercial vehicles utilize spring actuators to provide the energy needed for a parking brake function. These heavy commercial vehicles often include electronic braking systems that provide the primary braking function. The primary brake function is a main or foundation brake function that is used to stop or slow rotation of a vehicle wheel during vehicle operation. The parking brake function is usually a separate system that is used to lock a vehicle wheel in a brakes applied position when the vehicle is parked. Traditionally, spring actuators are used for providing the parking and service brake functions. This increases cost and reduces available packaging space for other wheel components.

It is possible for the electronic braking system (EBS) to include an electronic parking control with a hand operated lever or handle that is moved by an operator into a park position. In response to movement of the hand operated lever into the park position, an electronic park signal is generated to control actuation of the brakes for parking. The electronic parking control uses the EBS to apply and release the brakes for parking. In such a system, the service actuators are used for parking and when the desired level of braking is achieved, the brakes are mechanically latched in the applied state. Not all vehicles are equipped with an electronic braking system (EBS). Further, some vehicles have an EBS but do not want the parking brake system to be electronically controlled. Also, it is desirable to eliminate the need for separate park spring actuators. Thus, there is a need for a parking brake system that pneumatically controls parking by using a service brake actuator, and which can be used in a vehicle with EBS or without EBS.

SUMMARY OF THE INVENTION

A parking brake system for a vehicle includes a pneumatically controlled parking brake actuator for a vehicle wheel. The vehicle wheel includes a vehicle brake that is selectively moved into a brake applied position by the parking brake actuator. The parking brake actuator also serves as a service brake actuator for the respective vehicle wheel. The parking brake system includes a hand control with a lever that is movable between a plurality of operational positions. When the lever is manually moved into a park position, a positive pneumatic pressure is used to actuate the parking brake actuator to move the vehicle brake into the brake applied position. Once the parking brake actuator is applied, a latching mechanism is activated to mechanically lock the vehicle brake in the brakes applied position.

In one disclosed embodiment, the hand control includes a valve that controls air flow within a line interconnecting a parking brake air supply to the parking brake actuator. The valve includes a gate that defines the plurality of operational positions, which include at least a park position, release position, and off position. The lever cooperates with the gate to move between the various operational positions. When the lever is moved out of the off position, a positive variable pressure is applied to front and rear service brake actuators. This provides a proportional braking phase on both front and rear axles as needed. In addition to providing proportional braking, the hand control is used to generate a parking brake force with service brake actuators.

The system operation will now be described. At the end of the proportional braking phase, the lever is moved within the gate to the park position. During this movement, the lever triggers a parking switch, which activates a latching mechanism to lock the vehicle brake in the brakes applied position. The latching mechanism is only activated if there is sufficient pressure in the line to the parking brake actuator. The parking brake actuators remain pressurized throughout parking, however, if air leaks away during this time, the vehicle brake will remain mechanically applied via the latching mechanism.

To un-park or release the vehicle brake from a parking state, the lever is moved to a release position within the gate. During this movement, the valve positively connects the line to the parking brake actuator to the parking brake air supply. This causes the vehicle brake to be reapplied, which permits the latching mechanism to unload. Further during this movement, the lever triggers an un-park switch, which activates and releases the latching mechanism. This operation is performed only after verification is made that sufficient air pressure exists in the line to unload the latching mechanism.

The subject parking brake system provides a simple and effective method for using pneumatic control to mechanically actuate a parking brake by using a service brake actuator. This eliminates the need for separate park spring actuators. Further, the subject parking brake system can be used in a vehicle with or without an electronic braking system. These and other features of the present invention can be best understood from the following specification and drawings, the following of which is a brief description.

DETAILED DESCRIPTION OF THE PREFERRED EMBODIMENT

Figure 1:
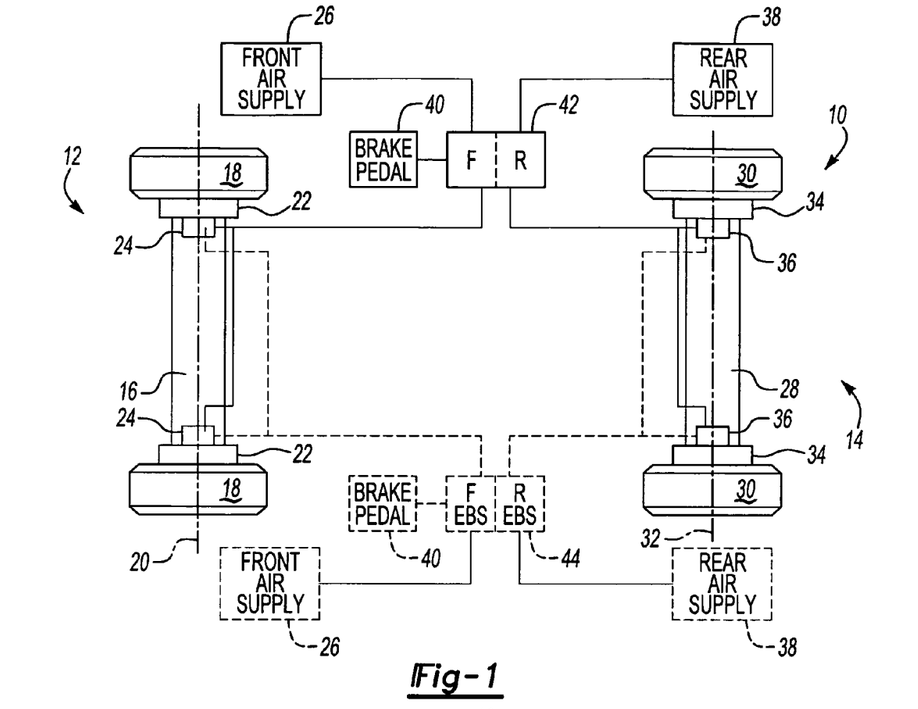
FIG. 1 is a schematic view of front and rear axle assemblies.

A vehicle braking system is shown generally at 10 in FIG. 1. The vehicle braking system 10 includes a front brake system 12 and a rear brake system 14. The front brake system 12 brakes a front axle assembly 16 having a pair of front wheels 18 spaced laterally apart from each other along a first lateral axis 20. Each front wheel 18 includes a front brake assembly 22 with a front actuator 24. The front actuators 24 are pneumatically connected to a front air supply 26.

The rear brake system 14 brakes a rear axle assembly 28 having a pair of rear wheels 30 spaced laterally apart from each other along a second lateral axis 32. Each rear wheel 30 includes a rear brake assembly 34 with a rear actuator 36. The rear actuators 36 are pneumatically connected to a rear air supply 38.

The rear air supply 38 is preferably separate from the front air supply 26, however, a common air supply for the front 12 and rear 14 brake systems could also be used. It should be understood that the front 22 and rear 34 brake assemblies can be any type of pneumatically actuated brake assembly known in the art. Further, the front 16 and rear 28 axle assemblies can be any type of axle known in the art, including but not limited to, a drive axle, non-drive axle, steer axle, tag axle, or tandem axle. Also, the vehicle braking system 10 could be used with independent suspensions.

The front 12 and rear 14 brake systems are service brake systems that apply a foundation braking force to slow or stop rotation of the front 18 and rear 30 wheels during vehicle operation. These service brake systems are responsive to driver input via a brake pedal 40 or other similar input. The front 12 and rear 14 brake systems can be mechanically controlled with a non-electronic braking system (NEBS) 42, or optionally can be electronically controlled with an electronic braking system (EBS) 44 as shown in dashed lines in FIG. 1. Braking operation of vehicles with NEBS 42 or EBS 44 is well-known and will not be discussed in further detail.

Figure 2:
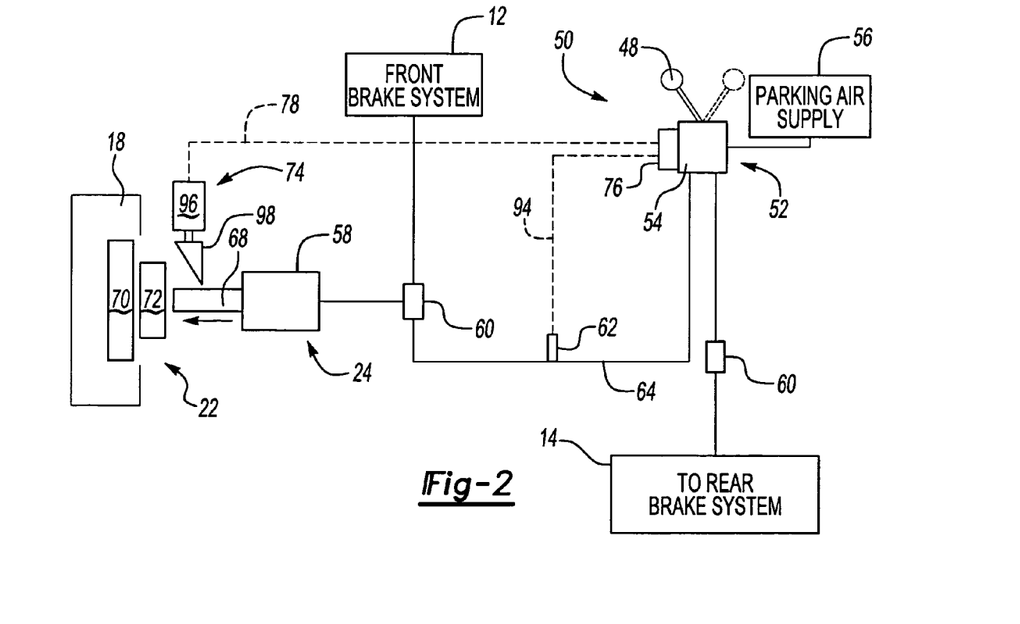
FIG. 2 is a schematic diagram of a parking brake system incorporating the subject invention.

The vehicle braking system 10 further includes a parking brake system 50, shown in FIG. 2, which is pneumatically controlled. The parking brake system 50 can be used with the NEBS 42 or EBS 44. For vehicles with NEBS 42, the parking brake system 50 provides a method for applying a parking force without electronic control. Further, for vehicles with EBS 44, the parking brake system 50 can be used in situations where specifications require that an EBS 44 cannot be used to initiate a parking action.

The parking brake system 50 includes a hand control 52 with a hand lever 48 manually movable by a vehicle operator between a plurality of operational positions. The hand control 52 also includes a valve assembly 54 that pneumatically connects a parking air supply 56 to the rear brake system 14 and to the front brake system 12. The parking air supply 56 is preferably a separate air supply from the front 26 and rear 38 air supplies.

The parking brake system 50 includes a parking brake actuator 58 for each front wheel 18. The parking brake actuator 58 is the same actuator as the front actuator 24 for each front wheel 18. This eliminates the need for separate spring actuators for each front wheel 18 in the front brake system 12. While only one front wheel 18 is shown in FIG. 2, it should be understood that the other front wheel 18 is similarly operated.

Two-way valves 60 connect the valve assembly 54 in the hand control 52 to the front 12 and rear 14 brake systems. A pressure sensor 62 measures line pressure in a line 64 connecting the valve assembly 54 to the two-way valve 60 for the front brake system 12. This two-way valve 60 also communicates with the parking brake actuator 58. The parking brake actuator 58 is preferably an air chamber 66 with an extendible member 68.

The front brake assembly 22 includes a rotating member 70 mounted for rotation with the front wheel 18 and a non-rotating member 72 fixed to a non-rotating axle component (not shown). In one example, the rotating member 70 is a rotor and the non-rotating member 72 is a pair of brake pads. In response to a park demand, the extendible member 68 forces the non-rotating member 72 into engagement with the rotating member 70 to move the front brake assembly 22 into a brakes applied position. Once the front brake assembly 22 is in the brakes applied position, a latching mechanism 74 is activated to mechanically lock and hold the front brake assembly 22 in the brakes applied condition through a parking phase. An electronic control unit (ECU) 76, associated with the hand control 52, generates a control signal 78 to activate the latching mechanism 74, shown schematically in FIG. 2.

The front brake assembly 22 will remain in a parked condition even if air leaks away from the parking brake actuator 58 due to the mechanically applied latching mechanism 74. This will be discussed in greater detail below. Further, while FIG. 2 only shows a parking brake actuator 58 for a front brake assembly 22, it should be understood that the rear brake assemblies 34 could also utilize a similar parking brake actuator to apply a parking brake force to the rear wheels 30.

The valve assembly 54 is similar in design to valves that are used to control lock actuators. The valve assembly 54 includes a gate 80, shown in FIGS. 3A–3D, that defines the plurality of operational positions. The plurality of operational positions includes at least an off position 82, a park position 84, and a un-park or release position 86. The hand lever 48 is moved between the various operational positions within the gate 80.

Figure 3A:
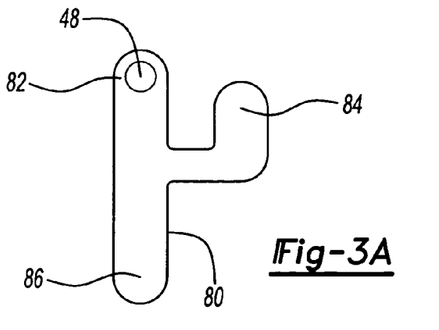
FIG. 3A is a schematic diagram of a hand control gate from the parking brake system of FIG. 1 showing a hand lever in a parking brake off position.
Figure 3B:
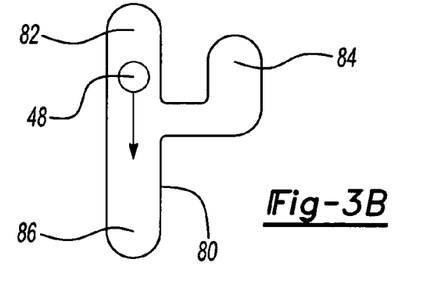
FIG. 3B is a schematic diagram of the hand control gate of FIG. 2A showing the hand lever in a proportional braking position.
Figure 3C:
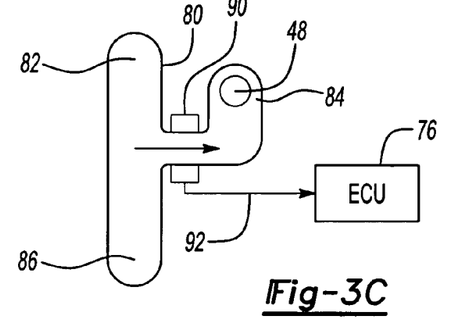
FIG. 3C is a schematic diagram of the hand control gate of FIG. 2A showing the hand lever in a parking brake applied position.

The parking brake system 50 operates in the following manner. Manual movement of the hand lever 48 out of the off position 82 and towards the park or release 86 positions causes the valve assembly 54 to generate an upright or positive variable pressure that is applied to the front 24 and rear 36 actuators. As discussed above, the front actuator 24 is also the same actuator used for parking. This provides proportional braking on both the front 16 and rear 28 axle assemblies as needed. Movement of the hand lever 48 in a proportional braking phase is shown in FIG. 3B. The movement of the hand lever 48 in this configuration is generally in a longitudinal direction.

Figure 4:
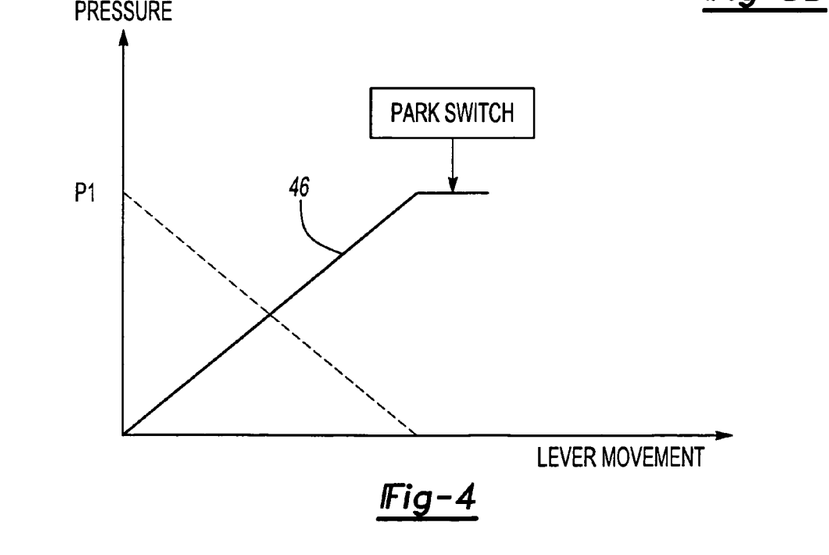
FIG. 4 is a graph of air pressure vs. hand lever movement for actuating the parking brake system.

The rising pressure in the front brake actuators 24 (parking brake actuator 58), in response to hand lever 48 movement, is shown in FIG. 4 at 46. When the hand lever 48 is moved across the gate 80 into the park position 84, the pressure reaches a dead band level as shown.

At the end of the proportional braking phase, the hand lever 48 is moved laterally in a direction generally transverse to the longitudinal direction, into the park position 84. This movement triggers a park switch 90 (see FIG. 3C). The park switch 90 generates a park signal 92 that is communicated to the ECU 76. As discussed above, the pressure sensor 62 measures pressure in the line 64. The pressure sensor 62 generates a pressure signal 94 that is communicated to the ECU 76. The ECU 76 determines whether there is sufficient pressure in the line 64 prior to activating the latching mechanism 74.

If sufficient pressure exits in the line 64, the ECU 76 generates the control signal 78 to energize the latching mechanism 74. A typical pressure would be seven (7) bar, i.e. a pressure of 7 bar is typically sufficient to permit activation of the latching mechanism 74. If the pressure is too low to permit secure parking, an operator warning signal would be given. The vehicle operator would have to allow time for a vehicle air compressor to restore sufficient air pressure in the parking air supply 56 before moving the vehicle into a parked state.

As discussed above, if sufficient pressure exits in the line 64, the ECU 76 generates the control signal 78 to energize the latching mechanism 74. The latching mechanism preferably includes a motor 96 with an extendible member 98. Power to the motor 96 is cut once motor stall is detected. One way of detecting motor stall is to monitor motor current. When the current starts to rise, it indicates that the extendible member 98 has engaged and locked an operating shaft 100 (see FIGS. 7A–7D) of the front brake assembly 22 in the parked condition. Thus, when the current rise meets a predetermined minimum level, power to the motor 96 is cut.

The parking brake actuator 58 remains pressurized while the latching mechanism 74 is in a locked or extended position. The latching mechanism 74 provides a mechanically applied back-up to maintain park load levels. Thus, if air leaks away from the parking brake actuator 58, the front brake assembly 22 remains mechanically applied.

Further, another advantage with this configuration is that as the parking brake actuator 58 remains pressurized, during parking it is possible to re-power the motor 96 after a period of time to address any shrinkage of brake components as the front brake assembly 22 cools. As the brake pads and rotors cool down, the operating shaft 100 will rotate further in a brake applied direction. This creates a gap between the extendible member 98 and the operating shaft 100. If air leaks away from the parking brake actuators 58, the operating shaft 100 will settle against the extendible member 98 but the level of braking will be reduced when compared to a level of braking when the parking demand was first made. By re-powering the motors 96, the extendible member 98 is moved into engagement with the operating shaft 100 again, creating a higher level of mechanical parking. The motors 96 can automatically be re-powered after a predetermined length of time has passed since the initial parking demand was made. Further, the motors 96 could be periodically re-powered at predetermined time intervals during the parking phase.

Figure 3D:
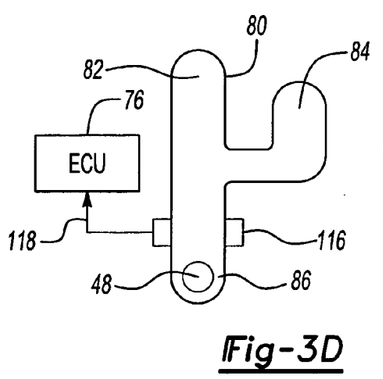
FIG. 3D is a schematic diagram of the hand control gate of FIG. 2A showing the hand lever in a parking brake release position.

When the parking phase is completed, the hand lever 48 is moved out of the park position 84 and into the un-park or release position 86, shown in FIG. 3D. This movement causes an upright element of the valve assembly 54 to connect the line 64 to the parking air supply 56. This causes the parking brake actuator 58 to reapply the front brake assembly 22 to unload the extendible member 98. Preferably, the valve assembly 54 provides proportional control as the hand lever 48 moves from the park position 84 in the gate 80 to the release position 86.

For example, if parking occurs at 7 bar, an un-latching pressure could be limited to 8 bar, creating less fatigue damage to brake components. This is shown at 110 in FIG. 5. P1 corresponds to pressure at parking and P2 corresponds to pressure at un-parking or release. To ensure that un-latching can always be achieved, it is necessary to deliver a level of pressure that is in excess of what can be achieved when parking via the hand control 52, or via the brake pedal 40, prior to operating the hand control 52 for parking. If the pressure available to the hand control 52 is too low to facilitate unloading of the latching mechanism 74, a warning signal would be generated. The vehicle operator would need to allow time for the vehicle air compressor to restore the pressure in the parking air supply 56 to a sufficient level.

Optionally, as shown at 112 in FIG. 4, the valve assembly 54 could connect the line 64 to full parking air supply 56 pressure, which would typically be 10 bar. The latching mechanism 74 could then be unloaded.

In either configuration, once the valve assembly 54 has reconnected the line 64 to the parking air supply 56, the movement of the hand lever 48 from the park position 84 towards the release position 86 triggers an un-park switch 116 (see FIG. 3D). The un-park switch 116 generates an un-park signal 118 that is communicated to the ECU 76. The ECU 76 again confirms that there is sufficient pressure in the line 64 with measurements from the pressure sensor 62, and generates the control signal 78 to energize the motors 96 to retract the extendible member 98.

Figure 6:
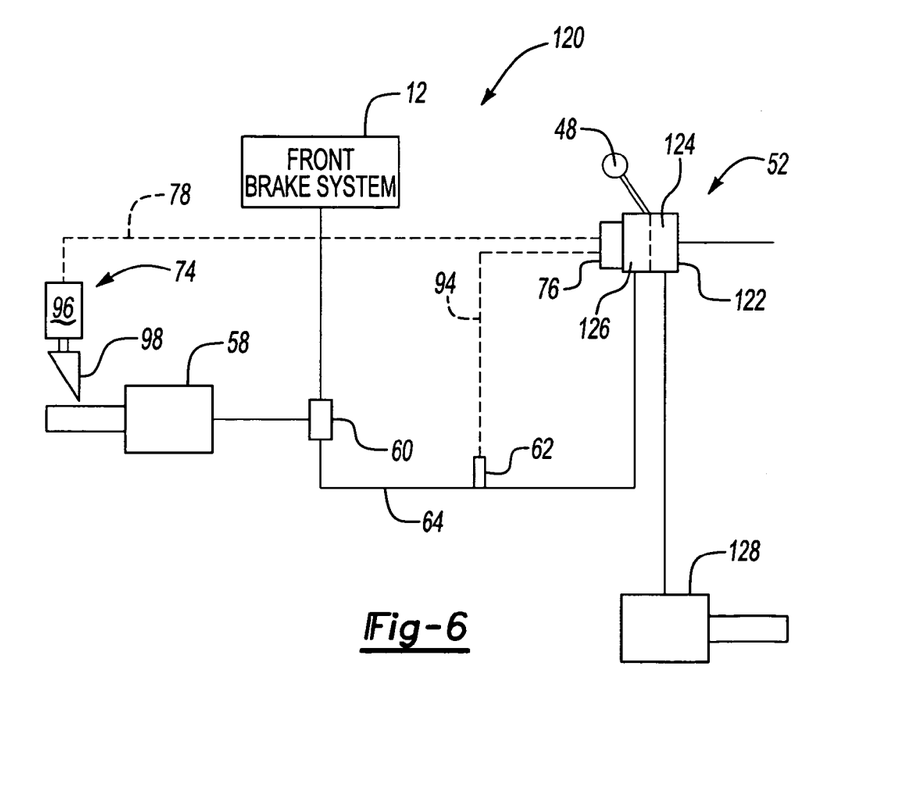
FIG. 6 is schematic diagram of another example of a parking brake system incorporating the subject invention.

FIG. 6 shows another example of a parking brake system 120 similar to that described above, but which provides the hand control 52 with a valve assembly 122 that has an inverse section 124 and an upright section 126. In response to a park demand, the inverse section 124 releases pressure causing rear spring actuators 128 to be applied, and the upright section 126 supplies positive pressure to the parking brake actuator 58. The upright section 126, parking brake actuator 58, and latching mechanism 74 operate as discussed above. Thus, front actuators 24 are used to provide both service and parking functions while separate rear spring actuators 128 are used to provide a rear parking function with the rear actuators 36 providing a rear service brake function.

Falling pressure to the rear spring actuators 128 due to the inverse section 124 of the valve assembly 122 is shown in a dashed line in FIG. 4. In this configuration it is possible to park on the front axle using normal service chambers while using spring actuators for the rear brake system 14. The inverse output can also be used on towing vehicles to provide an inverse signal to a trailer control valve.

Figure 7A:
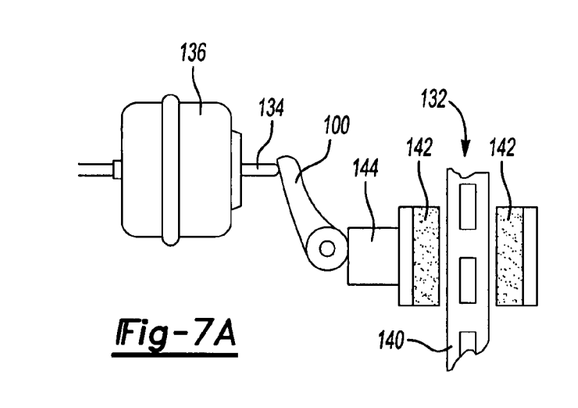
FIG. 7A is schematic diagram of an air chamber and brake assembly in a non-applied or release condition.
Figure 7B:
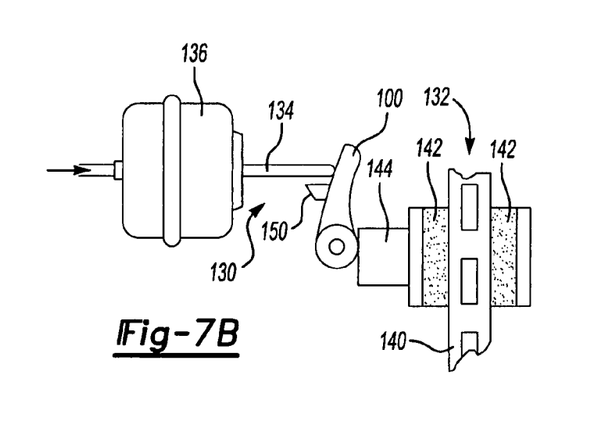
FIG. 7B is the air chamber and brake assembly of FIG. 7A in a park applied and locked condition.

Any type of latching mechanism 74 known in the art can be used to mechanically lock the front 22 and/or rear 34 brake assemblies in a park condition. One example of a latching mechanism 130 is shown in FIGS. 7A–7B. FIG. 7A shows a vehicle brake 132 in a released or non-applied position with an extendible member 134 of air chamber 136 being retracted. FIG. 7B shows the vehicle brake 132 in a park applied position with the extendible member 134 extended.

In this example, the vehicle brake 132 includes a rotating rotor 140 and a pair of brake pads 142 that are mounted to a non-rotating structure. An actuator 144 moves the brake pads 142 into engagement with the rotating rotor 140 to achieve the park applied position shown in FIG. 7B. The brake pads 142 are connected in some fashion to both move upon actuation of the actuator 144. The extendible member 134 of air chamber 136 engages the operating shaft 100 to actuate the actuator 144.

Figure 5:
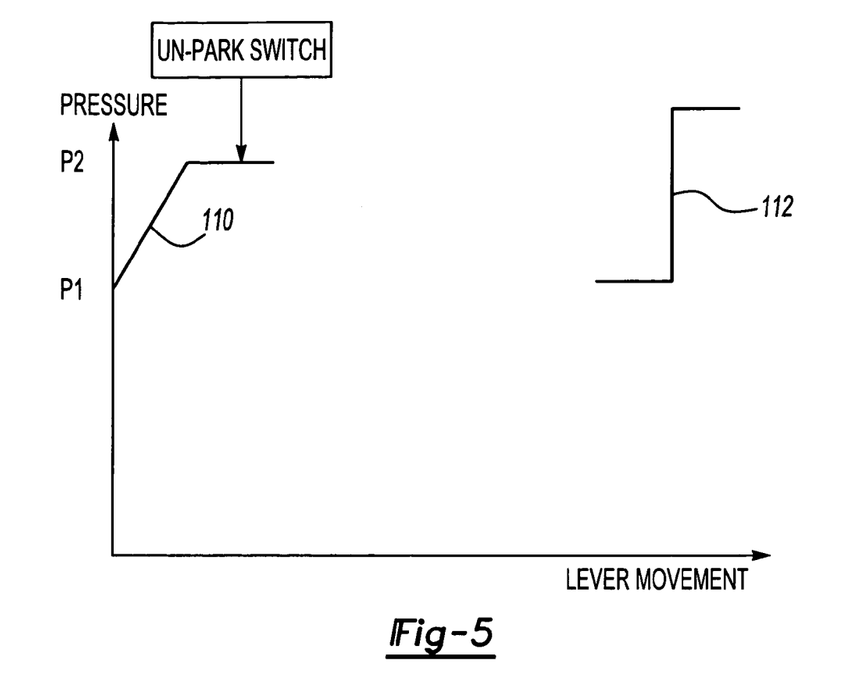
FIG. 5 is a graph of air pressure vs. hand lever movement for releasing the parking brake system.
Figure 7C:
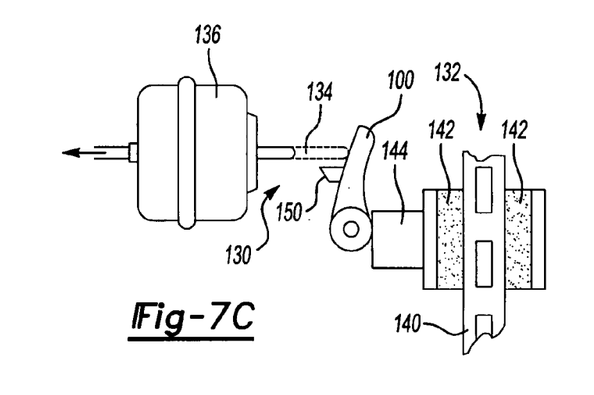
FIG. 7C is the air chamber and brake assembly of FIG. 7A in an air chamber exhausted and park lock condition.
Figure 7D:
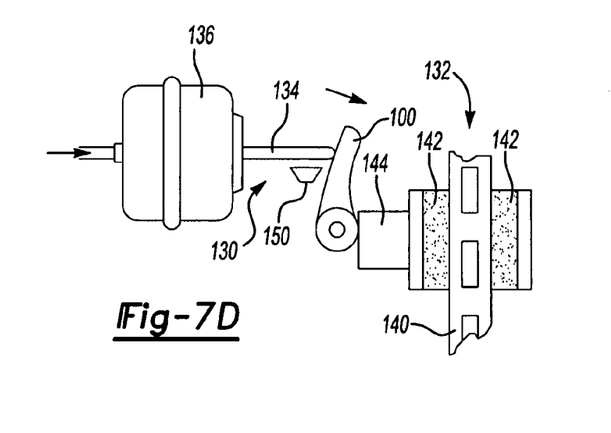
FIG. 7D is the air chamber and brake assembly of FIG. 7A in a park release and unlocked condition.

The latching mechanism 130 includes an extendible member 98 as shown in FIGS. 2 and 5 that extends to an end. A wedge member 150 (see FIG. 7B) is mounted for movement with the end. The wedge member 150 engages the operating shaft 100 to lock the vehicle brake 132 in the applied position. FIG. 7C shows that the vehicle brake 132 remains in park should the air chamber 136 become exhausted through air leakage, due to the mechanical engagement between the wedge member 150 and the operating shaft 100. FIG. 7D shows the vehicle brake 132 being reapplied to release the wedge member 150 from engagement with the operating shaft 100 to allow the latching mechanism 130 to be unloaded, as discussed above.

Further, as discussed above, the latching mechanism 130 can be reactivated to compensate for brake cooling. As the brake pads 142 and rotors 140 cool down, the operating shaft 100 will rotate further in a brake applied direction. This creates a gap between the wedge member 150 and the operating shaft 100. If air leaks away from the air chamber 136, the operating shaft 100 will settle against the wedge member 150 but the level of braking will be reduced when compared to a level of braking when the parking demand was first made. By re-powering the latching mechanism 130, the wedge member 150 is moved into engagement with the operating shaft 100 again, creating a higher level of mechanical parking. The wedge member 150 includes a tapered surface that slidably engages the operating shaft to achieve this higher level of mechanical parking.

An example of one type of latching mechanism and wedge member is found in U.S. patent application Ser. No. 10/701,354 filed on Nov. 4, 2003 and Ser. No. 10/701,351 filed on Nov. 4, 2003, both of which are assigned to the assignee of the subject application and are hereby incorporated by reference.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A parking brake system for a vehicle comprising:
   a hand control including a manually operated hand lever;
   a parking brake actuator pneumatically actuated in response to a positive pressure generated by movement of said manually operated hand lever; and
   a latching mechanism that selectively locks a vehicle brake in a park condition when said parking brake actuator is actuated wherein said latching mechanism initially locks the vehicle brake at a first mechanical parking force level and wherein said latching mechanism is automatically reactivated in response to the vehicle brake cooling subsequent to movement of said manually controlled hand lever into a park position and wherein reactivation of said latching mechanism generates a second mechanicaL parking force level that is greater than said first mechanical parking force level.

2. The parking brake system according to claim 1 wherein said hand control includes a valve for controlling air flow from a dedicated parking brake air supply to said parking brake actuator.

3. The parking brake system according to claim 2 wherein said valve includes a gate having a plurality of gate positions through which said manually operated hand lever is moved, said plurality of gate positions including at least a park position, a release position, and an off position.

4. The parking brake system according to claim 3 wherein proportional braking for front or rear service brakes is generated as said manually operated hand lever is moved out of said off position toward at least one of said park position and said release position.

5. The parking brake system according to claim 3 wherein movement of said manually operated hand lever out of said off position generates a positive variable air pressure that is communicated to said parking brake actuator to apply a parking brake force to the vehicle brake.

6. The parking brake system according to claim 5 including a first switch that generates a latch signal when said manually operated hand lever is moved into said park position wherein said latching mechanism is activated to lock the vehicle brake in said park condition in response to said latch signal.

7. The parking brake system according to claim 6 including a second switch tat generates an unlatch signal when said manually operated hand lever is moved into said release position wherein said latching mechanism is activated to unlock said latching mechanism in response to said unlatch signal.

8. The parking brake system according to claim 7 wherein said valve connects said parking brake actuator to said dedicated parking brake air supply to increase air pressure in a line connecting said valve to said parking brake actuator to unload said latching mechanism.

9. The parking brake system according to claim 8 including a pressure sensor in fluid communication with said valve to measure air pressure downstream from said valve and upstream from said parking brake actuator wherein said pressure sensor generates a pressure signal that is communicated to an electronic control unit that determines whether said line has sufficient pressure to unload said latching mechanism.

10. The parking brake system according to claim 6 wherein said latching mechanism is only actuated if a predetermined minimum amount of air pressure is maintained within a line interconnecting said valve and said parking brake actuator.

11. The parking brake system according to claim 1 wherein said latching mechanism is electronically controlled in response to movement of said manually operated hand lever.

12. The parking brake system according to claim 1 including a front service brake system for front axle brakes and a rear service brake system for rear axle brakes wherein each of said front axle brakes includes one parking brake actuator that simultaneously serves as a service brake actuator.

13. The parking brake system according to claim 12 wherein said front and rear service brake systems are non-electronically controlled.

14. The parking brake system according to claim 12 wherein said front and rear service brake systems are electronically controlled.

15. The parking brake system according to claim 1 wherein said hand control comprises a pneumatic hand control that pneumatically actuates the vehicle brake in response to a parking request without generating an electrical parking braking demand signal.

16. A method of actuating a parking brake system comprising the steps of
   (a) manually moving a hand control lever out of an off position;
   (b) generating a positive air pressure to pneumatically apply a parking brake actuator in response to step (a); and
   (c) mechanically locking a vehicle brake in a park condition when the hand control lever is moved into a park position and the parking brake actuator is applied, including initially locking the vehicle brake at a first mechanical parking force level with a latch mechanism and automatically re-activating the latch mechanism in response to the vehicle brake cooling after the hand control lever is moved into the park position to generate a second mechanical parking force level that is greater than the first mechanical parking force level.

17. The method according to claim 16 including the steps of moving the hand control lever within a gate having a plurality of positions including at least the off position; the park position, and a release position; generating a positive air pressure for acuating the parking brake actuator when the hand control lever is moved out of the off position; and generating proportional braking for front and rear service brake systems by moving the hand control lever between the off, park, and release positions.

18. The method according to claim 17 including the step of using the parking brake actuator as a service brake actuator.

19. The method according to claim 16 wherein step (b) includes pneumatically actuating the vehicle brake in response to a parking request without generating an electrical parking braking demand signal.

20. A method of actuating a parking brake system comprising the steps of;
  (a) manually moving a hand control lever out of an off position;
  (b) generating a positive air pressure to pneumatically apply a parking brake actuator in response to step (a); and
  (c) mechanically locking a vehicle brake in a park condition when the hand control lever is moved into a park position and the parking brake actuator is applied, including initially locking the vehicle brake at a first mechanical parking force level with a latch mechanism, and automatically reactivating the latch mechanism in response to the vehicle brake cooling subsequent to movement of the hand control lever into the park position wherein reactivation of the latch mechanism generates a second mechanical parking force level that is greater than The first mechanical parking force level.

* * * * *

UNITED STATES PATENT AND TRADEMARK OFFICE
CERTIFICATE OF CORRECTION

| | | |
|---|---|---|
| PATENT NO. | : 7,121,634 B2 | Page 1 of 1 |
| APPLICATION NO. | : 10/864785 | |
| DATED | : October 17, 2006 | |
| INVENTOR(S) | : Denis John McCann | |

It is certified that error appears in the above-identified patent and that said Letters Patent is hereby corrected as shown below:

Column 8, line 10: "tat" should be --that--

Signed and Sealed this

Thirteenth Day of February, 2007

JON W. DUDAS
*Director of the United States Patent and Trademark Office*